UNITED STATES PATENT OFFICE.

ARTHUR C. SPENCER AND EDWIN C. ECKEL, OF WASHINGTON, DISTRICT OF COLUMBIA.

HYDRAULIC CEMENT.

No. 912,266.      Specification of Letters Patent.      Patented Feb. 9, 1909.

Application filed February 29, 1908. Serial No. 418,568.

*To all whom it may concern:*

Be it known that we, ARTHUR C. SPENCER and EDWIN C. ECKEL, citizens of the United States, residing at Washington, District of Columbia, have invented certain new and useful Improvements in Hydraulic Cements, of which the following is a specification.

This invention relates to that class of hydraulic cements in which iron is substituted wholly or in part for the alumina ordinarily contained therein. These cements may be such as are either clinkered or fused and finally pulverized, or may be those in which the ingredients are not chemically united before gaging with water.

During recent years the value for marine uses of hydraulic cements of the kind referred to has been fully demonstrated inasmuch as such cements will satisfactorily resist the action of sea water. These cements contain essentially lime, silica, and iron oxid (or manganese or chromium oxid) combined as silicate and ferrate of lime, and have been made from oxid ores of heavy metals of the iron group, or slag or artificial by-products of metallurgical operations containing iron. Such iron-containing materials as have heretofore been used or suggested for use have been mostly iron oxids comparatively rich in iron, and are of too great value in other industries to be available commercially as cheap ingredients of a cement mixture, and are inconveniently located with respect to the seaboard, where such cements are preferably made and necessarily used.

The object of the present invention is to cheapen and improve the manufacture of such cements, the decreased cost arising not only from the cheapness and accessibility of the natural material at or near tidewater, but also from the lower temperature required to sinter or fuse the mixture, as well also as the production of by-products of some value.

In our process, the source of iron particularly utilized is a cheap natural and easily fusible silicate of iron and potassium called glauconite or the related mineral greenalite, both of which have the common name greensand; or rocks containing greensand are used; but we do not intend to exclude other natural materials containing adequate amounts of iron silicate for the purposes of our invention.

In carrying out the invention for clinkered or fused cements, greensand or rocks containing sufficient greensand to produce the desired product are mixed in any desired proportions with calcareous materials such as lime, limestone, lime-marl or other sources of calcium oxid; with dolomite or other source of magnesium oxid; or with both calcareous and magnesian materials. Silica or silicious materials are added if necessary to secure the desired composition of the mix.

In cases where greensand occurs disseminated in calcareous limestone or marl the rock may have essentially the desired composition and require little or no tempering with other materials. The mixed materials are pulverized and then either clinkered or sintered with an excess of air as in the ordinary manufacture of Portland cement, or they may be clinkered in the absence of an excess of air or melted in any furnace of proper type; and the product which results is finally pulverized and is ready for use. These natural iron silicates are too low in iron to have ever been considered as ores thereof, but they are especially suitable for introducing an iron constituent into hydraulic cement. They are superior to iron oxids or ores because of their cheapness, their natural fineness of grain, their accessibility and their ready fusibility. In greensand iron is already chemically combined with silica, another of the materials essential to the mix, and the reaction involved in sintering therefore takes place at a lower temperature than is possible if the iron be in the form of an oxid. The potash of the greensand also lowers the fusing point of the mixture, and, being volatilized at the temperatures employed, may be recovered by known processes as a by-product of the cement manufacture.

To prepare cement analogous to puzzolan cement, greensand or other iron silicate is well dried and pulverized and mixed in the desired proportion with powdered lime or with powdered lime hydrate, or with calcined magnesite or dolomite either slaked or unslaked.

We claim:

1. A hydraulic cement mixture containing natural iron silicate as a principal ingredient.

2. A hydraulic cement mixture containing greensand as a principal ingredient.

3. A hydraulic cement mixture containing natural iron silicate and material rich in an alkaline earth.

4. A hydraulic cement mixture containing greensand and calcareous material.

5. A hydraulic cement mixture made of natural iron silicate and other cement-forming materials.

6. A hydraulic cement mixture made of natural material rich in iron silicate, and material rich in an alkaline earth.

7. A hydraulic cement mixture made of materials rich in iron silicate and containing potassium, and calcareous material.

In testimony whereof we affix our signatures, in presence of two witnesses.

ARTHUR C. SPENCER.
EDWIN C. ECKEL.

Witnesses:
M. L. MORTON,
GEO. E. TEW.